Sept. 9, 1930.         A. H. BARKER         1,775,152
HEATING DEVICE FOR BUILDINGS
Filed Nov. 15, 1929      3 Sheets-Sheet 1
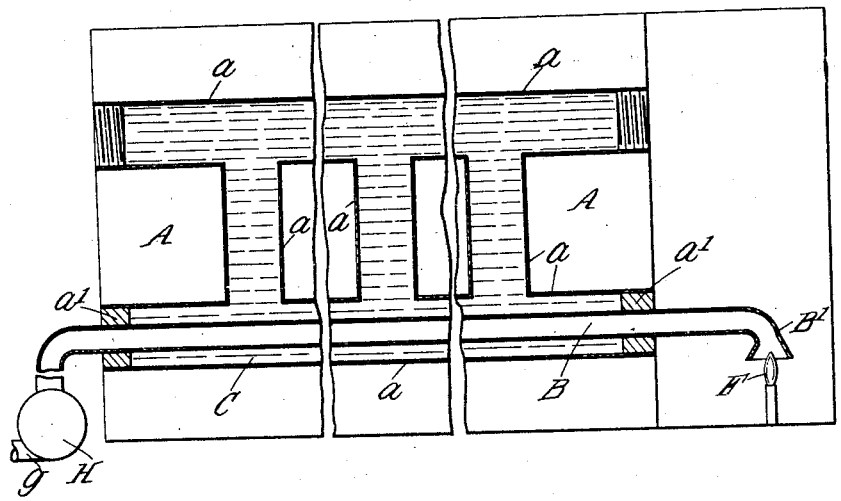
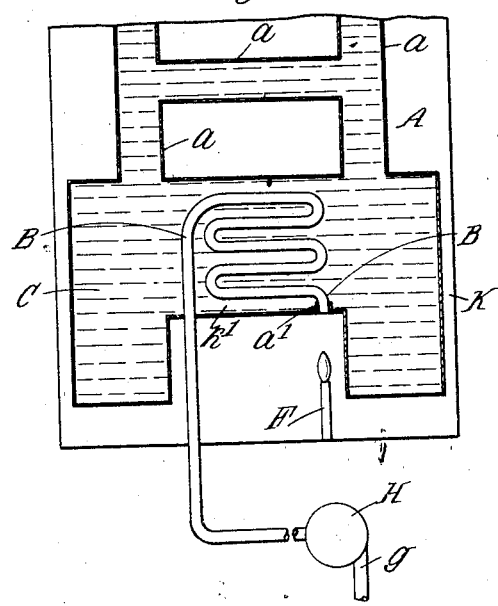
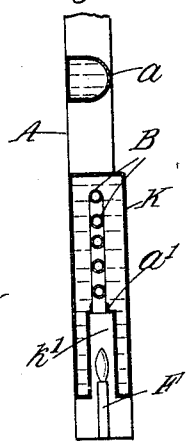
Inventor:
Arthur Henry Barker
By
Pennie Davis Marvin & Edmonds
attorneys Sept. 9, 1930.  A. H. BARKER  1,775,152
HEATING DEVICE FOR BUILDINGS
Filed Nov. 15, 1929  3 Sheets-Sheet 2
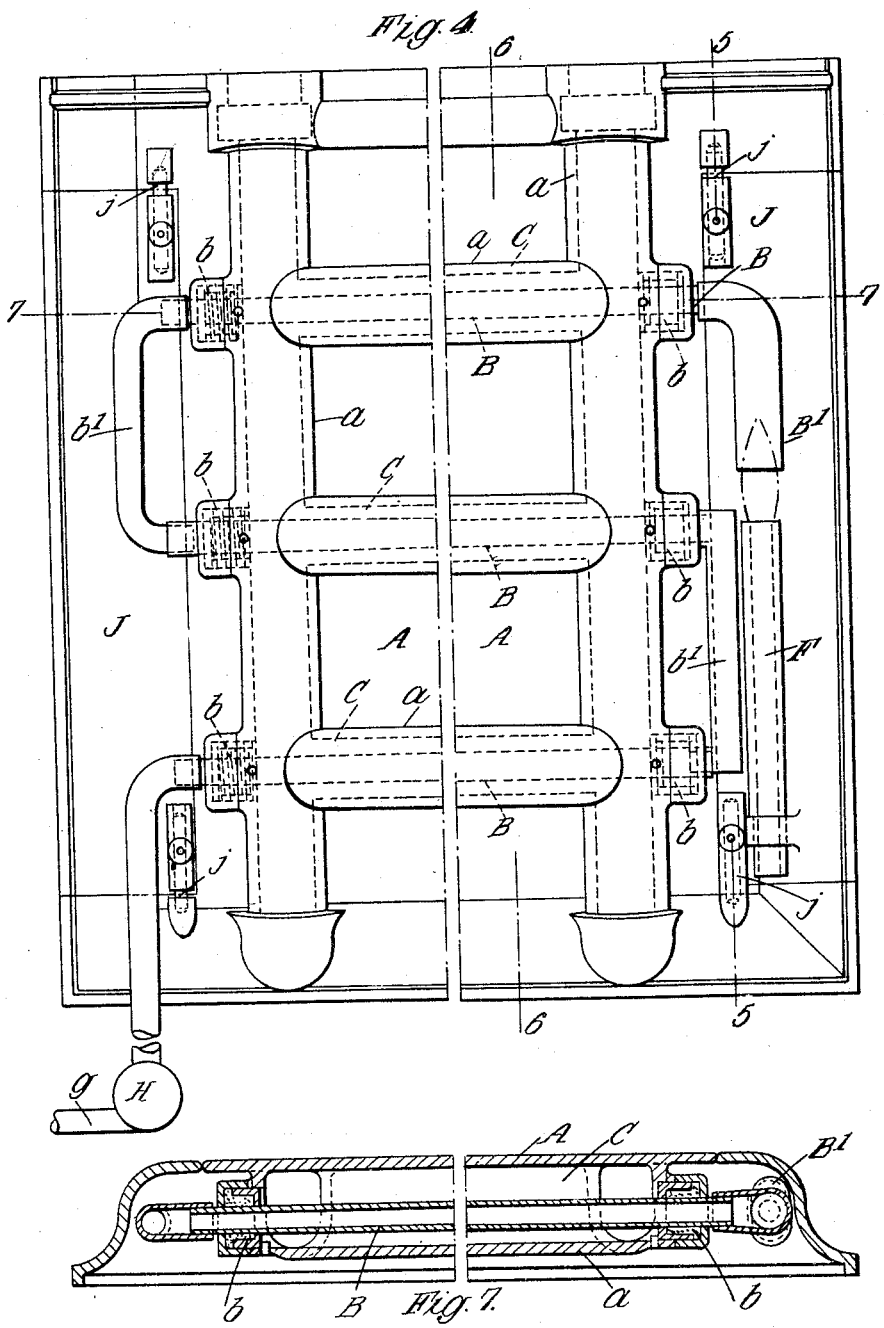

Sept. 9, 1930.   A. H. BARKER   1,775,152
HEATING DEVICE FOR BUILDINGS
Filed Nov. 15, 1929    3 Sheets-Sheet 3

Inventor:
Arthur Henry Barker
By
Pennie Davis Marvin & Edmonds
attorneys

Patented Sept. 9, 1930

1,775,152

UNITED STATES PATENT OFFICE

ARTHUR HENRY BARKER, OF WESTMINSTER, LONDON, ENGLAND

HEATING DEVICE FOR BUILDINGS

Application filed November 15, 1929, Serial No. 407,427, and in Great Britain October 22, 1928.

This invention relates to heating devices for buildings in which there is employed a metal heat radiating surface or plate affixed to the wall or other surface of the room to be heated and having conduits or passages through which hot gaseous products of combustion derived from a gas burner or the like are caused to flow under the influence of a fan or other appropriate means and after parting with their heat are discharged through an outlet leading to the open air. With heating devices of this kind the hot gaseous products pass directly through the said conduits or passages and in consequence that portion of the heat radiating plate, adjacent to the point where the hot gaseous fluid enters the said conduits or passages, is apt to reach an unduly high temperature while at the point where the fluid leaves the said conduits or passages the temperature of the plate may be unduly low owing to the hot gaseous products having been cooled in their passage through the conduits or passages. It is the chief object of the present invention to equalize the temperature over the whole of the plate to a much greater extent than is practicable with heating devices of the above stated kind.

According to the invention conduits or passages are formed over the whole or a considerable area of the heat radiating plate or plates as an inter-communicating system, preferably with cross connections, through which a heating medium such as water circulates, said medium being heated by hot gaseous products derived from a gas burner or the like and caused (under the influence of a fan or other appropriate means) to pass through a pipe or tube extending through or surrounded by the said heating medium and eventually to escape into the open air after parting with their heat to the latter. The inner pipe or tube may extend through only one of the conduits or passages in which case it may be of straight formation or it may extend through a number of the conduits or passages in succession in which case it may be of sinuous formation. The inner pipe or tube may be made of the same material as the outer conduits or passages or of a different material; preferably it is made of copper or some other non-corrosive metal. In some cases instead of the pipe or tube for the gaseous products extending through the conduits or passages it may be of coiled serpentine or similar formation and housed within a chamber or casing filled with the heating medium which surrounds the pipe or tube and is in communication with the heating medium in the said conduits or passages. In the passage of the hot gaseous products through the said pipe or tube they readily communicate their heat to the surrounding heating medium which being mobile circulates through the inter-communicating system of conduits or passages and in so doing communicates its heat to the latter over the whole area of the plate and so equalizes the temperature thereof.

In order that the said invention may be clearly understood and readily carried into effect the same will now be described more fully with reference to the accompanying drawings in which:—

Figure 1 is a diagrammatic view showing a back sectional elevation of a horizontal heat-radiating sectional plate with the pipe or tube for the hot gaseous products of straight formation and extending through only one of the passages or conduits.

Figures 2 and 3 are diagrammatic views showing respectively a back sectional elevation and a vertical cross-section of a vertical heat-radiating sectional plate with the pipe or tube for the hot gaseous products of serpentine formation surrounded by the heating medium contained in a chamber or casing which communicates directly with the inter-communicating system of conduits or passages.

Figure 4 is a back elevation of a horizontal heat-radiating sectional plate with the pipe or tube for the hot gaseous products of sinuous formation and extending through all of the passages or conduits shown.

Figure 5:
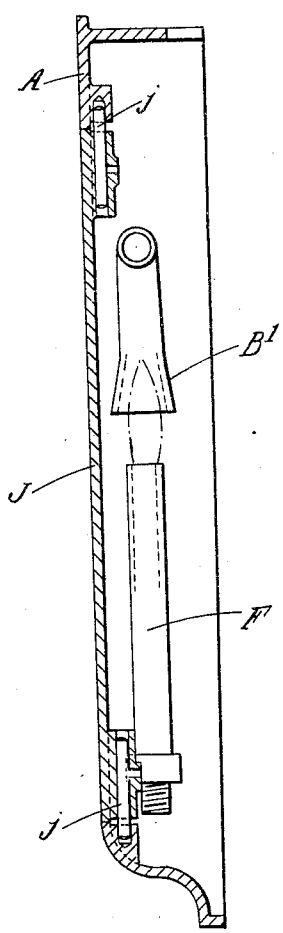
Figure 6:
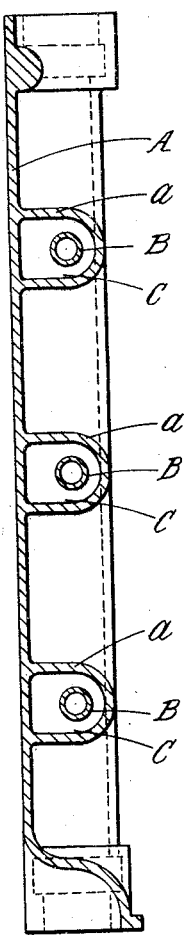

Figures 5 and 6 are vertical sections taken approximately on the lines 5—5 and 6—6 of Figure 4, and Figure 7 is a horizontal section taken approximately on the line 7—7 of Figure 4.

A is the heat radiating plate and $a, a$ are the passages or conduits cast or otherwise formed integral therewith and constituting part of the inter-communicating system. B is the pipe or tube for the hot gaseous products which is surrounded by the water or other heating medium in the space C within, or in communication with, the inter-communicating system of conduits or passages $a$, the said system being filled with the heating medium through a suitable orifice. F is the gas burner from which the hot gaseous products are derived and which is directed into the inlet end of the pipe or tube B through an enlargement or hood $B^1$. H is the suction fan connected to the outlet end of the pipe or tube B and operating to draw the hot products of combustion from the burner F through the pipe or tube, and, after having communicated their heat to the water or other heating medium which surrounds the said pipe or tube and circulates in the inter-communicating system of conduits or passages, to discharge them in a cool condition through an exhaust pipe $g$ leading to the exterior of the room.

In Figure 1 the pipe or tube B for the hot gaseous products is of straight formation and extends through only the lowermost horizontal conduit or passage $a$ which is provided with fluid-tight glands $a^1$ at the ends where the pipe or tube enters and leaves the conduit or passage, said glands serving also to support the pipe with a space C around it for the water or other heating medium, said space communicating directly with the water or other heating medium in the other conduits or passages, so that it can circulate freely through the entire inter-communicating system.

In Figures 2 and 3 the pipe or tube B for the hot gaseous products is of serpentine form housed within the chamber or casing K, and having its inlet and outlet ends entering and leaving the same through fluid-tight glands at $a^1$. This chamber or casing is filled with the water or other heating medium employed which communicates directly with the water or other heating medium contained in the conduits or passages $a, a$ in the vertical heat-radiating sectional plate A, so that free circulation of the water or other heating medium can take place throughout the whole inter-communicating system as in the last preceding arrangements. The gas burner F is situated within a space or compartment $k^1$ in the said chamber or casing K and immediately below the inlet end of the serpentine pipe or tube B, the other or outlet end of which is connected with the suction fan H by which the hot gaseous products are drawn through the said pipe or tube from the burner and discharged in a cooled condition through the exhaust pipe $g$ leading to the exterior of the room as before. It will be evident that the casing K may be separated from the plate A provided that the passages $a$ are placed in communication with the fluid in the chamber or casing K by means of communicating pipes.

In Figures 4 to 7 the pipe or tube B for the hot gaseous products passes in succession through several of the horizontal conduits or passages $a$, the ends of the portions of the said pipe that extend through the glands $b$, $b$ being alternately connected together by bent or angle tubes $b^1$ $b^1$ so as to constitute a continuous sinuous pipe or tube. The inlet end of the uppermost portion of the pipe or tube has an enlarged portion or hood $B^1$ through which the hot gaseous products from the gas burner F are drawn by the suction fan H and discharged in a cool condition through an exhaust pipe as in the other examples already described. The opposite ends of the heat-radiating plate are shown provided with panels J, J having hinges $j, j$ connecting them to the body portion of the plate, one of the panels carrying the gas burner F. By thus hinging the panels to the heat-radiating plate, provision is made for enabling the connections of the bent or angle tubes $b^1$ with the pipe or tube B to be inspected or repaired and also for enabling the gas burner to be ignited. The spaces C surrounding the pipe or tube B are filled with the water or other heating medium employed which is in free communication with that contained in the other portions of the conduits or passages constituting the inter-communicating system.

Instead of the hot gaseous products being derived from a gas flame as shown in the drawings it may be derived from a flame of burning petroleum or from burning charcoal or any combustible material capable of being completely burnt.

If desired a pilot light may be provided for igniting the gas at the burner and in that case a bi-metallic or other suitable form of thermostatic device may be used in association with the pilot light for causing the supply of gas to the burner to be cut off in the event of the pilot light becoming unintentionally extinguished.

A thermostatic device may be provided in the room where the heating device is situated for controlling the amount of gas supplied to the burner in accordance with the temperature of the room.

In the ensuing claiming clauses when I refer to a "heat-radiating plate" I intend to include a plurality of plates and when I refer to "the wall" of the room I intend to include the ceiling.

What I claim and desire to secure by Letters Patent of the United States is:—

1. A heating device for buildings, comprising in the combination of a substantially flat and extensive metal heat-radiating plate adapted to be affixed to the wall of a room to be heated having conduits formed thereon to constitute an intercommunicating system through which a heating fluid circulates, a pipe passing through a portion of said fluid and forming a passage for hot gaseous products of combustion derived from a burner, means for causing said hot gaseous products to pass through said pipe and eventually to escape into the open air after parting with their heat to the fluid and means for enabling said burner and the pipe to be readily reached.

2. A heating device for buildings, comprising the combination of a substantially flat and extensive heat-radiating plate adapted to be affixed to the wall of a room to be heated having conduits formed thereon to constitute an inter-communicating system through which a heating fluid circulates, a pipe of sinuous formation passing through a plurality of said conduits and forming a passage for hot gaseous products of combustion derived from a burner, means for causing said hot gaseous products to pass through said pipe and eventually escape into the open air and displaceable panels for enabling said burner and the pipe to be readily reached.

ARTHUR HENRY BARKER.